United States Patent [19]
Veitenhansl

[11] Patent Number: 5,564,627
[45] Date of Patent: Oct. 15, 1996

[54] HEATING CYCLE SYSTEM OF A VEHICLE

[75] Inventor: Horst Veitenhansl, Gereteried, Germany

[73] Assignee: Webasto Thermosysteme GmbH, Germany

[21] Appl. No.: 526,921

[22] Filed: Sep. 12, 1995

Related U.S. Application Data

[63] Continuation of PCT/EP94/00755 Mar. 10, 1994 published as WO

[51] Int. Cl.⁶ ........................................ B60H 1/06
[52] U.S. Cl. ........................ 237/123 B; 237/12.3 C; 417/325
[58] Field of Search .................. 237/8 C, 12.3 B, 237/12.3 C; 417/325

[56] References Cited

U.S. PATENT DOCUMENTS 5,431,340   7/1995   Schirpke et al. ............... 237/12.3 B

FOREIGN PATENT DOCUMENTS

| 2234802 | 9/1987 | European Pat. Off. . |
| 86 05587 | 10/1986 | France . |
| 4042404 | 11/1992 | Germany . |

*Primary Examiner*—William E. Tapoicai
*Attorney, Agent, or Firm*—Sixbey, Friedman, Leedom & Ferguson, P.C.; David S. Safran

[57] ABSTRACT

The invention relates to a heating cycle system of a motor vehicle which includes the vehicle internal combustion engine, a heating device which is independent of the engine, an interior heat exchanger, a circulating pump, and a bypass line which connects a return line to a flow line. According to the invention the circulating pump is driven by a reversible electric motor and is used as a control element for selective operation of a small cycle including only the heating device and the vehicle heat exchanger or a large cycle which also includes the internal combustion engine. The direction of operation of the circulating pump controls a valve which directs fluid to either the small or the large cycle.

9 Claims, 3 Drawing Sheets

HEATING CYCLE SYSTEM OF A VEHICLE

BACKGROUND OF THE INVENTION

This application is a continuation-in-part of PCT Appln. No. PCT/EP94/00755 filed Mar. 10, 1994 and designating the United States.

1. Field of the Invention

The invention relates to a heating cycle system for a motor vehicle having an interior heat exchanger to receive heated coolant from an internal combustion engine and a circulating pump to deliver coolant as a liquid heat transfer medium. The system includes an independent heating unit to heat the coolant when it is not sufficiently heated by the engine.

2. Description of Related Art

Vehicle heating cycle systems in which a heat transfer medium can be heated by a heating device independent of the engine and circulated selectively either with the inclusion of an internal combustion engine in a large cycle (inline cycle) or by bypassing the latter via a bypass line in a small cycle which comprises only the motor vehicle heat exchanger and the heating device are known, as illustrated by German application DE-A1 40 22 731. In this system, the aforementioned operating modes are controlled by means of a valve which requires an additional electrical drive. This increases the installation cost and also, die to the additional parts, the failure probability of the system.

SUMMARY OF THE INVENTION

A primary object of the invention is to make available in a heating cycle system for a motor vehicle, a simple system for implementing various heat transfer medium cycles.

Another object of the invention is to provide a heating cycle system for a motor vehicle with a circulating pump which is reversible in its direction of rotation and, depending on the direction of rotation, delivers heat transfer medium via one of two separate outlet openings either into a large cycle system through a return line to the internal combustion engine or through a bypass line into a small cycle system which comprises the heating device and the interior heat exchanger. Thus, by simply changing the direction of rotation of the circulating pump which can be easily done by means of a reversible motor, various cycles can be controlled without the need for additional valves operated by means of external energy.

The circulating pump is reversed preferably as a function of a temperature value of the heat transfer medium. This can be done especially easily by means of a thermostatic switch which is preferably located on the intake side of the circulating pump.

A further object of the invention is to provide a heating cycle system for a motor vehicle with a circulating pump wherein each of the outlet openings of the circulating pump is connected to one of two chambers of a valve which are separated from one another in a sealed manner by means of a movable part. One chamber can be connected to the return line to the internal combustion engine and the other can be connected to a bypass line. The delivery pressure of the circulating pump operating for delivery to the bypass line causes the movable part to be moved in the direction of the chamber which leads to the return line to seal access to the return line. For reversed delivery operation of the circulating pump to the return line, the movable part is moved in the direction of the other chamber and seals the access to the bypass line. The movable part can be designed as a membrane and can be used directly to seal the respective line. However, according to another embodiment, on either side of the movable part sealing elements can be provided for engaging or disengaging the bypass or return line. Alternatively to a membrane, the movable part can also be designed as a spring-mounted piston.

A still further object of the invention is to provide a heating cycle system for a motor vehicle having a mode of operation where heat transfer medium delivery takes place both in the direction to the engine and also in the direction to the vehicle heat exchanger, as makes sense for example in the compartment night heating mode of a truck to prevent frequent restarts of the heating device. To accomplish this, in the movable part of a control valve there can be a passage or channel which can be engaged and disengaged by means of an integrated thermostatic valve. To provide a reduced installation cost, the circulating pump and the control valve form a single structural unit which can be attached preferably directly to the heating device.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

Figure 1:
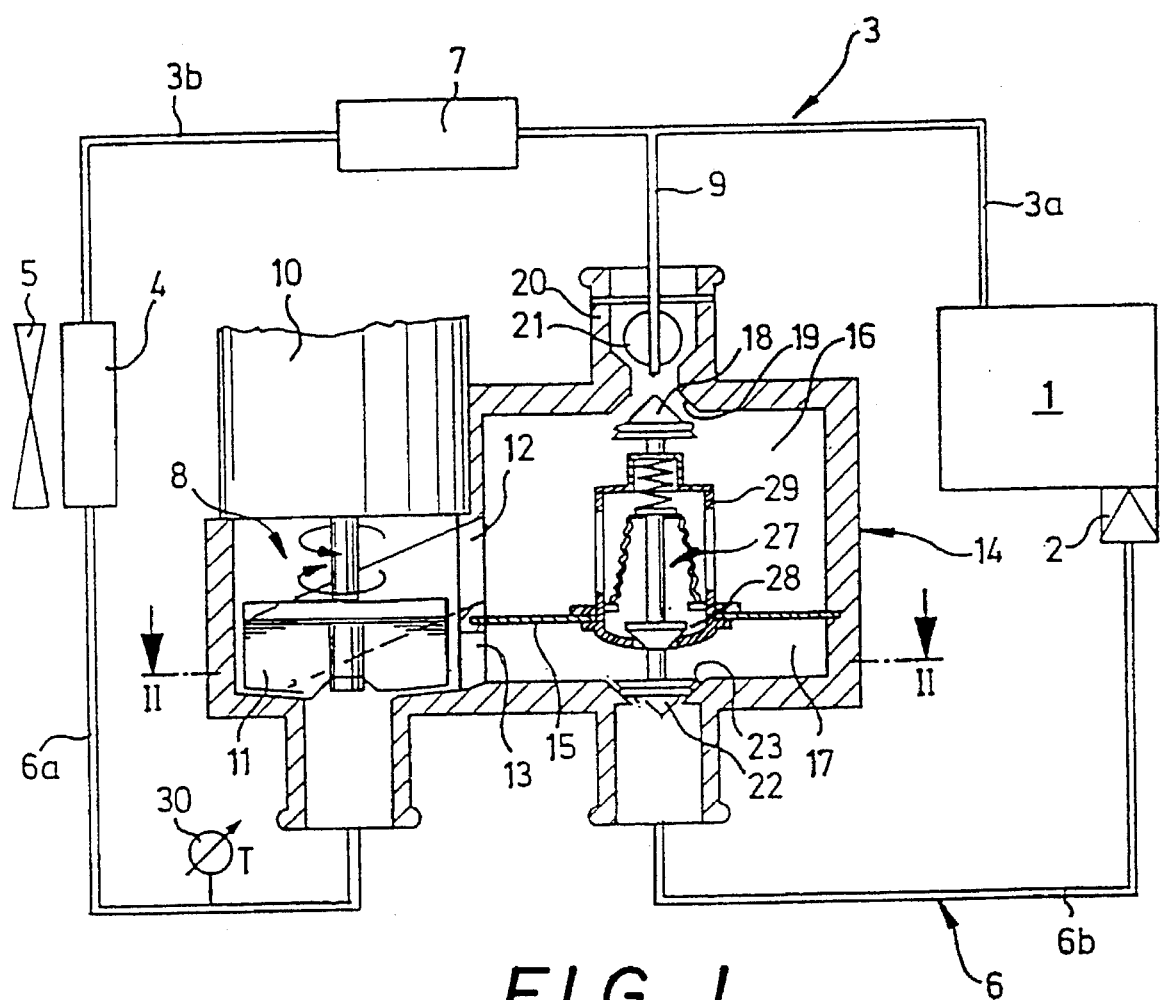
FIG. 1 shows a schematic representation of the heating cycle system for a vehicle of the present invention with a highly enlarged partial view of a circulating pump and control valve.

In FIG. 1, an internal combustion engine 1 through which a liquid heat exchange medium flows as a coolant, a pump 2 secured to the engine, a flow line 3, a vehicle interior heat exchanger 4 and a return line 6 form a heating cycle system for heating a vehicle interior when internal combustion engine 1 is operating. Interior heat exchanger 4 through which the heat transfer medium flows in heat exchange with air supplied by a fan 5 gives up thermal energy to a vehicle interior which is not shown. To preheat the vehicle interior with internal combustion engine 1 inoperative or to add heat when internal combustion engine 1 is still cold or in an unfavorable load range, there is a separate heating device 7 in flow line 3. This is a known heating device which is operated by means of liquid fuel, with a heat exchanger through which a liquid heat transfer medium likewise flows. Alternatively to direct placement of heating device 7 in flow line 3, an arrangement of heating device 7 in a branch parallel to flow line 3 is also possible.

Return line 6 and flow line 3 are connected by means of a bypass line 9. The flow line is divided into a first section 3a between internal combustion engine 1 and bypass line 9 and into second section 3b between bypass line 9 and heat exchanger 4. Likewise return line 6 is divided into a first section 6a from heat exchanger 4 and into a second section 6b to the internal combustion engine 1.

In a section of return line 6a is circulating pump 8 which can be operated alternately running clockwise or counterclockwise by means of reversible electric motor 10. Circulating pump 8 is connected on the intake side of first section 6a of return line 6. On the delivery side circulating pump 8, depending on the direction in which pump impeller 11 is turning, is connected either via a first outlet opening 12 to bypass line 9 or via a second outlet opening 13 to second section 6b of return line 6. With the corresponding inclined configuration of pump impeller 11 and the housing of circulating pump 8, this connection can be made directly; in the embodiment described with its simple pump impeller provided with straight blades (FIG. 2) the delivery-side connection to bypass line 9 or return line 6 is made via valve 14. Valve 14 is divided by membrane 15 into first chamber 16 and second chamber 17. First upper angled outlet opening 12 originating from circulating pump 8 empties into first chamber 16 and bypass line 9 discharges from it. Second lower angled outlet opening 13 empties into second chamber 17 and from it discharges into second section 6b of return line 6. Membrane 15 is sealed to the housing of valve 14 and can be moved in the vertical direction within the interior of the housing of valve 14 in FIG. 1. When membrane 15 moves upward, sealing element 18 attached to its upper side comes to rest on valve seat 19 at the outlet to bypass line 9. When membrane 15 moves downward, sealing element 22 attached to it rests against appropriately shaped valve seat 23 at the outlet to return line 6.

Downstream of valve seat 19 at the outlet 20 to bypass line 9 there is check valve 21 in the outlet attached to valve 14. The check valve prevents backflow of heat transfer medium from bypass line 9 into first chamber 16. This check valve 21 can, however, be omitted.

Sealing elements 18, 19 can be attached either directly to membrane 15, or, as shown in FIG. 1, to sleeve-shaped body 29 which extends through membrane 15 and into which a thermostatic valve 27 is integrated. This thermostatic valve opens to open passage channel 28 located in the interior of sleeve-shaped body 29 to second chamber 17 when a certain heat exchange medium temperature is exceeded in first chamber 16.

Figure 2:
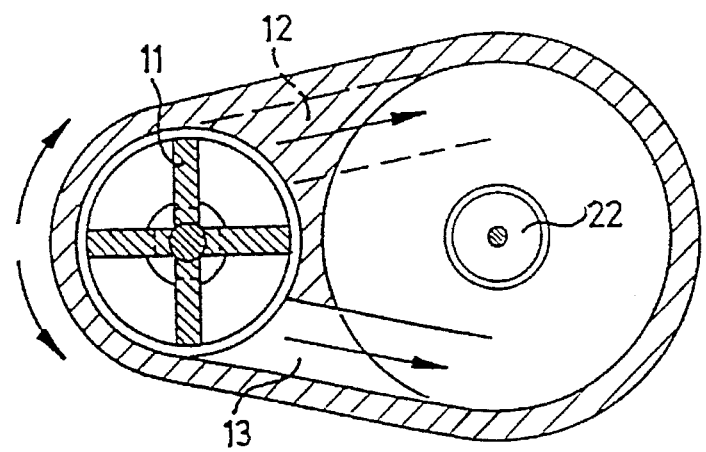
FIG. 2 shows a horizontal section along line II–II in FIG. 1.

With internal combustion engine 1 initially off, the function of the heat cycle system shown in FIGS. 1 and 2 will be described below. Depending on whether heat exchange medium from the internal combustion engine 1 is to be included in the preheating operation of heating device 7, the circulating pump begins turning clockwise or counterclockwise. This choice can be made beforehand via a selector switch on the driver's control panel, but it can also be derived from a control device controlling the type of heating device start. For example, operation of the heating device 7 may be initiated by means of a known preselect clock or by means of a radio remote starting means. At the same time, depending on the purpose of heating device 7, a hard-wired preference circuit can be installed either at the plant or by the installation shop. In the following, it is assumed that heating device 7 is designed to preferably first heat up the vehicle interior via heat exchanger 4. Thus the circulating pump begins to operate turning clockwise and due to the upward inclination of the blades of impeller 11, delivers heat transfer medium from the first section of return line 6a via first outlet opening 12 into first chamber 16 of valve 14. By means of the delivery pressure of circulating pump 8 which builds up in first chamber 16 of valve 14, membrane 15 is pressed downward and sealing element 22 attached to it rests on valve seat 23. Second section 6b of return line 6 is blocked thereby and no coolant can reach engine 1 from circulating pump 8. The heat transfer medium is transported via check valve 21 and bypass line 9 to heating device 7, heated there and delivered via second section 3b of flow line 3 to heat exchanger 4.

By bypassing cold engine 1 in which most of the heat transfer medium is located, very fast heat-up of the heat transfer medium, and therefore of the vehicle interior takes place in the small circuit between heating device 7, heat exchanger 4 and circulating pump 8. If in doing so a first heat threshold value of the heat transfer medium is ascertained to have been exceeded by a temperature sensor 30, electric motor 10 is reversed and circulating pump 8 is now operated turning counterclockwise. In this way, due to the inclination of the blades of the impeller 11, the heat transfer medium is now delivered at a lower level through second outlet opening 13 to second chamber 17 of valve 14. By means of the pressure in chamber 17 which is building up, membrane 15 is moved upward, lifting sealing element 22 off valve seat 23, return line 6b is opened and at the same time sealing element 18 comes to rest on valve seat 19, thus blocking bypass line 9. The heat transfer medium is at this point delivered into the large cycle from circulating pump 8 via return line 6b, internal combustion engine 1, flow line 3, heating device 7, heat exchanger 4 and the first branch of return line 6a, and in doing so also preheats internal combustion engine 1 at the same time. Temperature sensor 30 can, as shown, be located in first section 6a of the return line; likewise it can also be integrated in heating device 7.

For an additional operating mode, i.e., preferred interior heating in continuous operation useful, for example, in the heating of a truck driver's compartment during a nighttime stop, the temperature-dependent reversal of electric motor 10 by temperature sensor 30 can be disengaged by the driver via a switch which is not shown. Circulating pump 8 then runs continuously clockwise and delivers the heat exchange medium to first chamber 16. When a predetermined second threshold valve of the temperature of the heat transfer medium which is above the first threshold value is reached, thermostatic valve 27 opens, clears passage channel 28 to second chamber 17 and in doing so lifts sealing element 22 off valve seat 23. In this way some of the delivered heat transfer medium continues to be moved in the small cycle via bypass line 9 and at the same time a smaller part moves in the large cycle via internal combustion engine 1. The second temperature threshold value for opening of thermostatic valve 27 is selected such that it is below the switching value at which a control device (not shown) for heating device 7 causes switchover from partial load operation to a control pause. Thus, in this mode frequent switching of heating device 7, especially restarts associated with noise emissions and additional electrical energy consumption, are prevented and heating device 7 can be continuously operated at the smallest power stage. Thermostatic valve 27 automatically controls this state by the described separation of the flow of heat exchange medium, without noise or consumption of outside energy.

Figure 3:
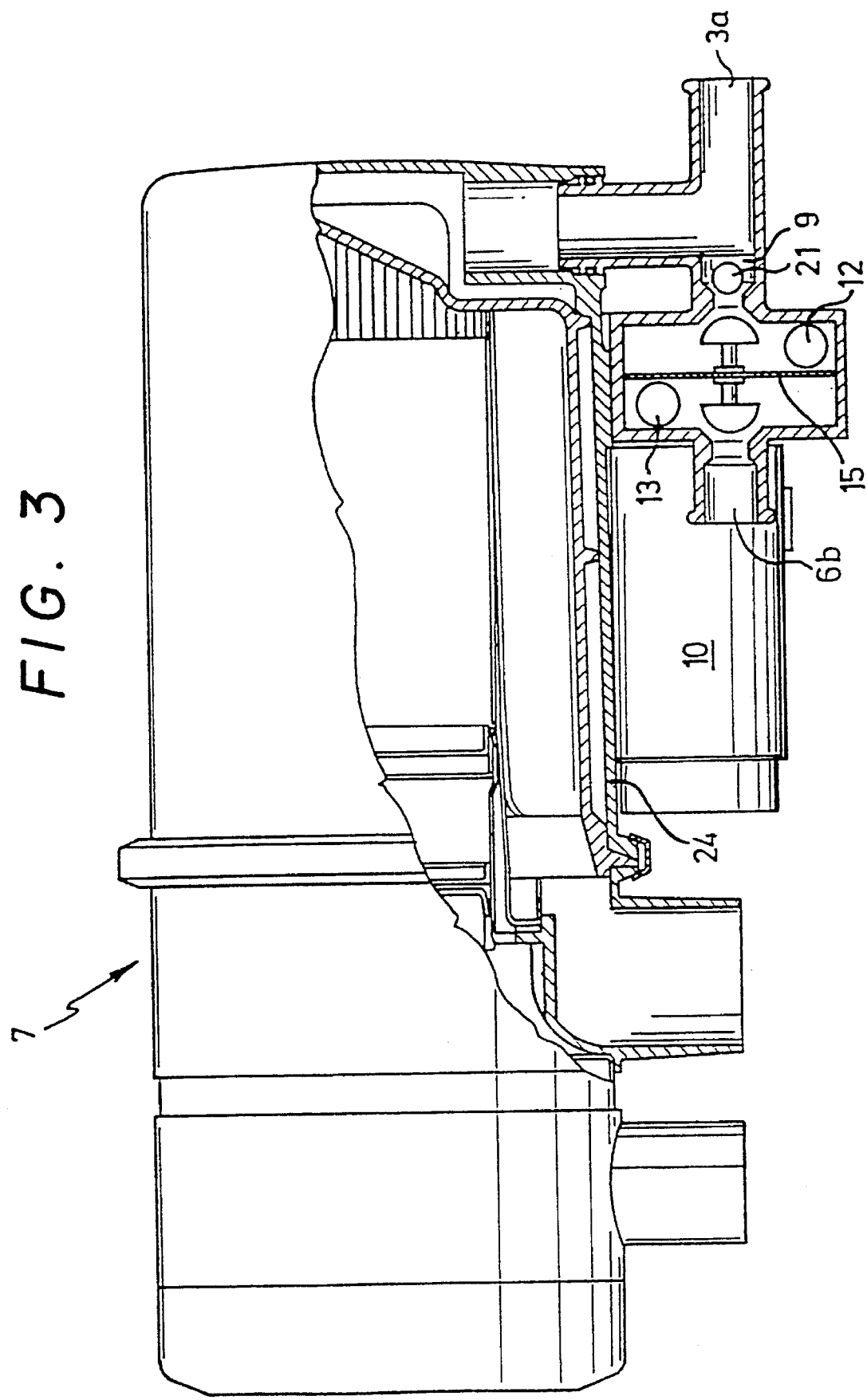
FIG. 3 shows a second embodiment of a heating device with flange-attached circulating pump and diaphragm valve.

In FIG. 3 one preferred version of the invention is shown in which pump 8 with electric motor 10 and valve 14 is attached directly to housing 24 of heating device 7. The other parts are designated according to their numbering in FIGS. 1 and 2. By means of this integrated construction the installation cost for the heating device is significantly reduced and the line paths are shortened, as is apparent in the example of bypass line 9 which is limited to a very short section behind check valve 21.

Figure 4:
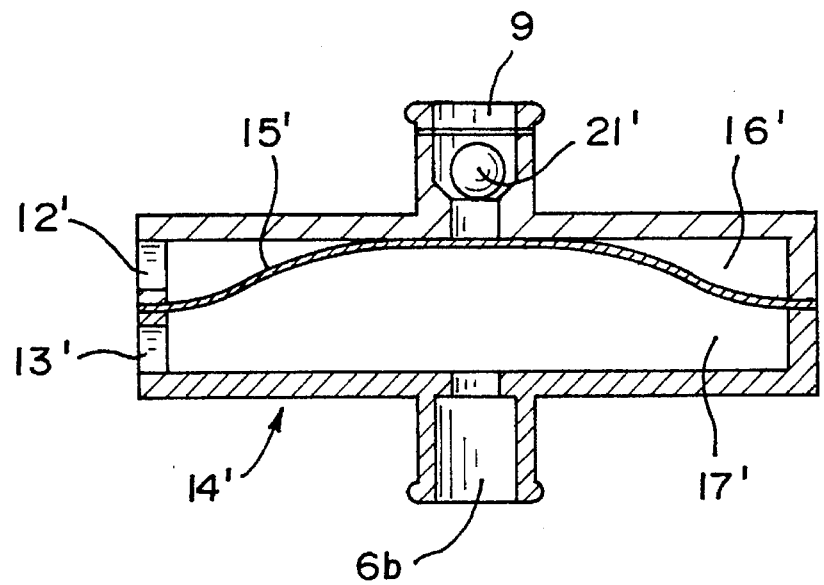
FIG. 4 shows one version of a diaphragm valve.

FIG. 4 shows a simplified version of a diaphragm valve labelled 14'. In contrast to the previously described embodiment membrane 15' in this case has no separate sealing element on the top or bottom, but itself forms the corresponding sealing element by its upper or its lower side coming to rest against the respective outlet openings of chambers 16' or 17'. The other parts are equivalent to those of the first example and are provided with the same reference numbers with the added prime.

Figure 5:
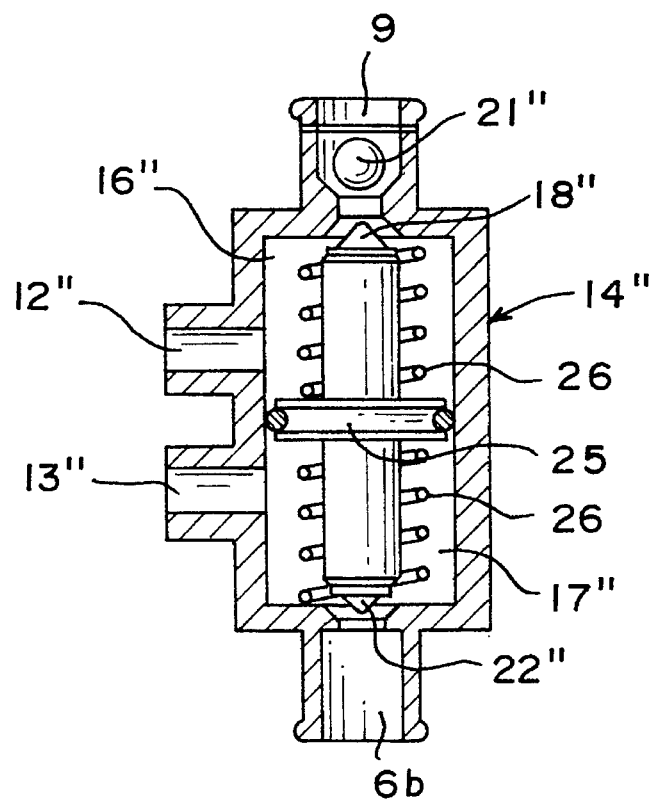
FIG. 5 shows another version of a valve.

FIG. 5 shows another version of a valve labelled 14" where first chamber 16" and second chamber 17" are separated from one another by means of sealing piston 25 which carries on the top sealing element 18" and on the bottom sealing element 22". The outlet openings of the circulating pump, which is not shown, are labelled 12" or 13" analogously to the first embodiment. Sealing piston 25 is supported by two springs 26 such that in the unpressurized state of chambers 16" or 17", it assumes a neutral middle position. When one of two chambers 16" or 17" receives heat transfer medium, sealing piston 25 moves in the direction of the other chamber 16" or 17" respectively, and of the sealing elements 22" or 18" comes to rest against an appropriately shaped seat of valve 14". Sealing piston 25, like membrane 15 of the first embodiment, suitable for holding thermostatic valve 27. Moreover, versions are conceivable which operate without springs 26 or in which only one spring 26 in chamber 17" provides for bias in the direction of bypass line 9 so that the large cycle is run in the base position of the piston.

By means of the invention, by simply reversing the direction of rotation of a circulating pump reliable control of different operating modes of a heating cycle system is achieved without additional valves controlled by means of outside energy.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. In a heating system for a motor vehicle having a liquid heat transfer medium large cycle flow path extending from an internal combustion engine to a heating device independent of the engine and then from the heating device to an interior compartment heat exchanger and back to the engine, the invention comprising:

a reversible circulating pump assembly connected between said interior compartment heat exchanger and said engine to pump heat transfer medium received from said heat exchanger to said engine, said pump assembly being operable in a normal direction and in a reversed direction opposite to said normal direction and having a first outlet opening and a second outlet opening spaced from said first outlet opening, the first outlet opening being connected to return heat transfer medium to said engine, and a bypass line having a first end connected to the flow path between said engine and said heating device, said second outlet opening being connected to direct heat transfer medium to said bypass line, said pump assembly operating in a normal direction to pump heat transfer medium to said first outlet opening and operating in a reversed direction to pump heat transfer medium to said second outlet opening.

2. The heating system of claim 1 wherein said reversible circulating pump assembly includes a reversible circulating pump and a valve connected to said bypass line into the flow path to said internal combustion engine, said valve including a first chamber connected to receive heat transfer medium from said first outlet opening and a second chamber connected to receive heat transfer medium from said second outlet opening, said first and second chambers being separated by a movable fluid pressure responsive unit which moves and responds to the introduction of heat transfer medium into said first chamber to close the flow path from said circulating pump assembly to said internal combustion engine and in response to heat transfer medium in said second chamber to close the flow path between said circulating pump assembly and said bypass line.

3. The heating system of claim 2 wherein the movable fluid pressure responsive unit is a membrane extending between said first and second chambers.

4. The heating system of claim 2 wherein said movable fluid pressure responsive unit includes a first valve closure member extending into said first chamber and a second valve closure member extending into said second chamber, said first valve closure member operating to close said bypass line and said second valve closure member operating to close said flow path to the internal combustion engine.

5. The heating system of claim 4 wherein the movable fluid pressure responsive unit is formed by a sealing piston.

6. The heating system of claim 2 wherein said movable fluid pressure responsive unit includes a fluid flow passage extending between said first and second chambers and a thermostatic valve mounted in said fluid flow passage to open or close said fluid flow passage in response to the temperature of said heat transfer medium rising above or dropping below a predetermined temperature respectively.

7. The heating unit of claim 1 which includes a temperature sensor mounted in said fluid flow path and operative in response to the temperature of said heat transfer medium rising above a predetermined temperature to reverse said circulating pump assembly.

8. The heating unit of claim 7 wherein said temperature sensor is located between said interior compartment heat exchanger and said circulating pump assembly.

9. The heating unit of claim 2 wherein said circulating pump assembly is directly attached to said independent heating device.

\* \* \* \* \*